United States Patent
Li et al.

(10) Patent No.: US 12,308,643 B2
(45) Date of Patent: May 20, 2025

(54) CONTROL DEVICE AND METHOD OF CONTROLLING POWER GENERATION SYSTEM

(71) Applicant: National Cheng Kung University, Tainan (TW)

(72) Inventors: Yueh-Heng Li, Tainan (TW); Yu-Ting Wu, Kaohsiung (TW); Chao-Wei Huang, Tainan (TW); Wei-Cheng Lo, Tainan (TW); Hsun-Chen Hsieh, Chiayi (TW); Po-Hung Lin, Kaohsiung (TW); Yi-Heng Chen, Changhua County (TW); Ping-Han Huang, Tainan (TW)

(73) Assignee: National Cheng Kung University, Tainan (TW)

( * ) Notice: Subject to any disclaimer, the term of this patent is extended or adjusted under 35 U.S.C. 154(b) by 487 days.

(21) Appl. No.: 17/571,553

(22) Filed: Jan. 10, 2022

(65) Prior Publication Data
US 2023/0170696 A1    Jun. 1, 2023

(30) Foreign Application Priority Data
Nov. 30, 2021    (TW) .................. 110144601

(51) Int. Cl.
*H02J 3/00*      (2006.01)
*H02J 3/38*      (2006.01)
*H02J 7/00*      (2006.01)

(52) U.S. Cl.
CPC .............. *H02J 3/004* (2020.01); *H02J 3/381* (2013.01); *H02J 7/00032* (2020.01); *H02J 2300/22* (2020.01); *H02J 2300/28* (2020.01)

(58) Field of Classification Search
None
See application file for complete search history.

(56) References Cited

U.S. PATENT DOCUMENTS

| 8,639,392 B2 | 1/2014 | Chassin | |
|---|---|---|---|
| 2013/0093193 A1* | 4/2013 | Schmidt | H02J 3/38 290/1 R |

FOREIGN PATENT DOCUMENTS

| CN | 201780489 U | 3/2011 |
|---|---|---|
| CN | 203397204 U | 1/2014 |
| CN | 105527858 A | 4/2016 |

(Continued)

OTHER PUBLICATIONS

Translation of TW M455769U1 (Year: 2013).*

*Primary Examiner* — Ryan A Jarrett
(74) *Attorney, Agent, or Firm* — Winston Hsu

(57) ABSTRACT

A control device for controlling a power generation system comprises a reception module, for receiving environmental data from the power generation system; an environment generation module, coupled to the reception module, for generating an environment state of the power generation system according to the environment data and an environment model; a strategy generation module, coupled to the environment generation module, for generating a power of the power generation system according to the environmental state, and for generating a control strategy of the power generation system according to the power; a transmission module, coupled to the strategy generation module, for transmitting the control strategy to the power generation system.

5 Claims, 12 Drawing Sheets

(56) References Cited

FOREIGN PATENT DOCUMENTS

| | | |
|---|---|---|
| CN | 104298121 B | 8/2017 |
| CN | 107612045 A | 1/2018 |
| CN | 110374788 A | 10/2019 |
| CN | 110880049 A | 3/2020 |
| CN | 111120222 A | 5/2020 |
| CN | 111146788 A | 5/2020 |
| CN | 111525684 A | 8/2020 |
| CN | 111555355 A | 8/2020 |
| CN | 111852729 A | 10/2020 |
| CN | 111878308 A | 11/2020 |
| CN | 112068511 A | 12/2020 |
| CN | 113657658 A | 11/2021 |
| TW | M455769 U1 * | 6/2013 |

* cited by examiner

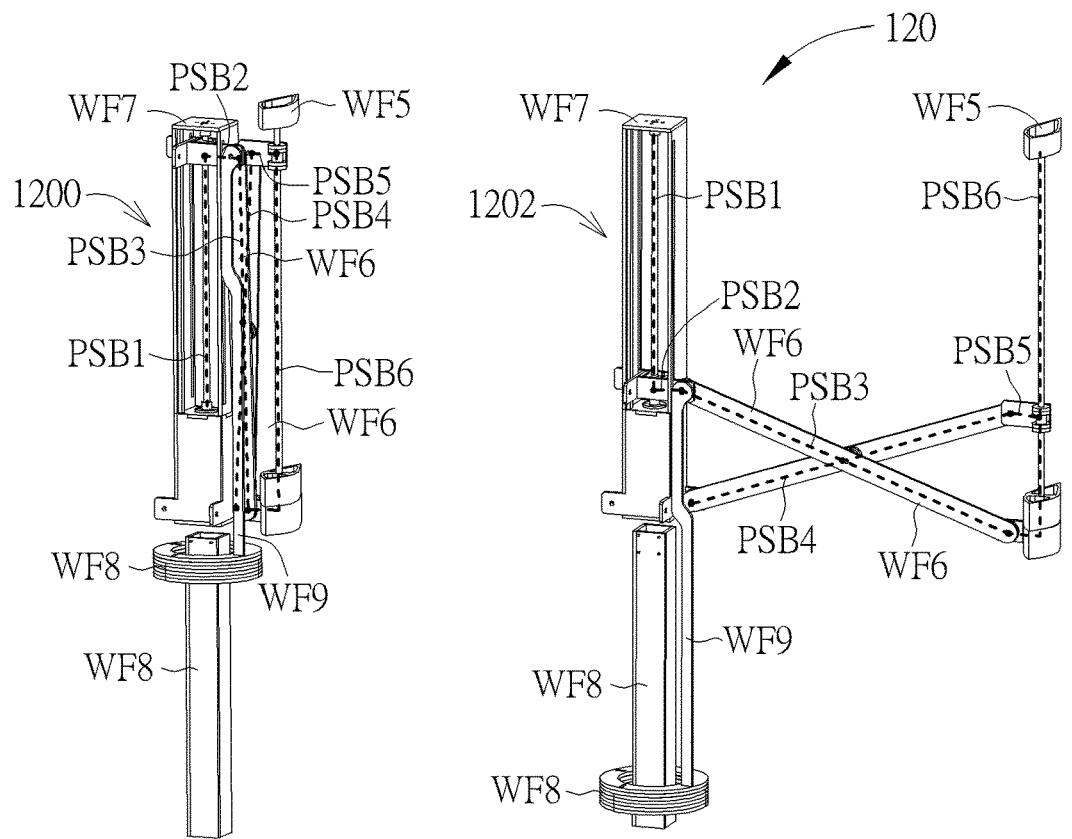
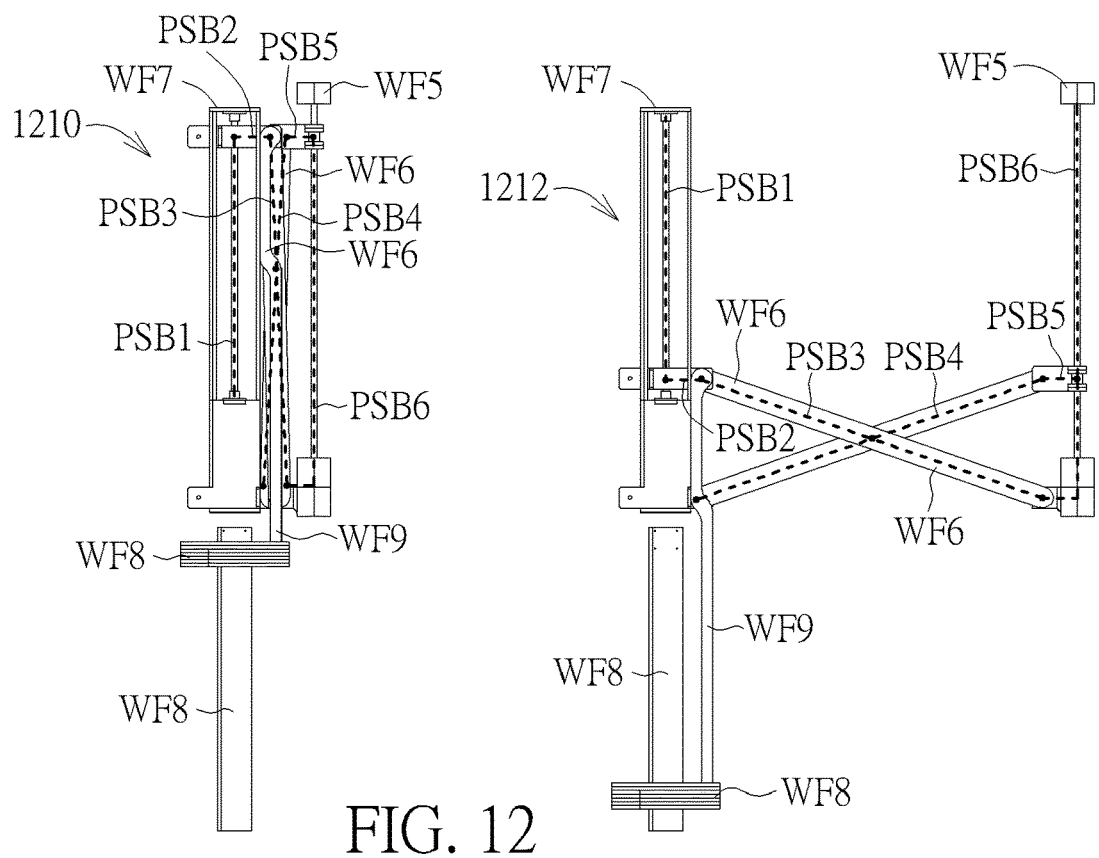
FIG. 12

CONTROL DEVICE AND METHOD OF CONTROLLING POWER GENERATION SYSTEM

CROSS REFERENCE TO RELATED APPLICATION

This application claims the benefit of Taiwan Patent Application No. 110144601, filed on Nov. 30, 2021, the entire content of which is incorporated herein by reference.

BACKGROUND OF THE INVENTION

1. Field of the Invention

The present invention relates to a control device and a method of controlling power generation system.

2. Description of the Prior Art

Renewable energy is energy generated from natural resources, such as solar energy, wind energy, tidal energy, geothermal energy, hydro energy or biogas energy. However, characteristics of the natural resources are uncontrollable, and it is difficult for a power generation system to generate a power stably via the renewable energy. For example, the power generation system may be damaged when a natural climate changes drastically, which makes it even more difficult for the power generation system to generate the power. The natural resources cannot be continuously obtained when the natural climate is unstable, which may also make it even more difficult for the power generation system to generate the power.

In addition, the power generation system must occupy a large amount of land resources for the power generation system to obtain sufficient natural resources. Thus, the power generation system is usually placed in a remote area. However, when the natural resources are difficult to be obtained and are difficult for the power generation system to generate the power, the land resources occupied by the power generation system are wasted. When the natural resources are available to enable the power generation system to generate the power, it is difficult to reduce a transmission cost of the power generated by the power generation system when the power generation system is placed in the remote area.

Thus, how to control the power generation system to improve the unstable situation of the power, to save the land resources and to save the transmission cost of the power, is a problem to be solved.

SUMMARY OF THE INVENTION

The present invention therefore provides a control device and a method of controlling power generation system, to solve the abovementioned problem.

A control device for controlling a power generation system, comprising: a reception module, for receiving environmental data from the power generation system; an environment generation module, coupled to the reception module, for generating an environmental state of the power generation system according to the environmental data and an environmental model; a strategy generation module, coupled to the environment generation module, for generating a power of the power generation system according to the environmental state, and for generating a control strategy of the power generation system according to the power; and a transmission module, coupled to the strategy generation module, for transmitting the control strategy to the power generation system.

A power generation system for generating a power, comprising: a sensing module, for sensing environmental data; a transmission module, coupled to the sensing module, for transmitting the environmental data to a control device; a reception module, coupled to the transmitting module, for receiving a control strategy from the control device; and at least one power generation module, coupled to the receiving module, for generating the power according to the control strategy, wherein the at least one power generation module comprises a lifting platform and at least one power generation device; wherein the power generation system is placed below a ground level.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 12 is a schematic diagram of a wind power generation device according to an example of the present invention.

DETAILED DESCRIPTION

Figure 1:
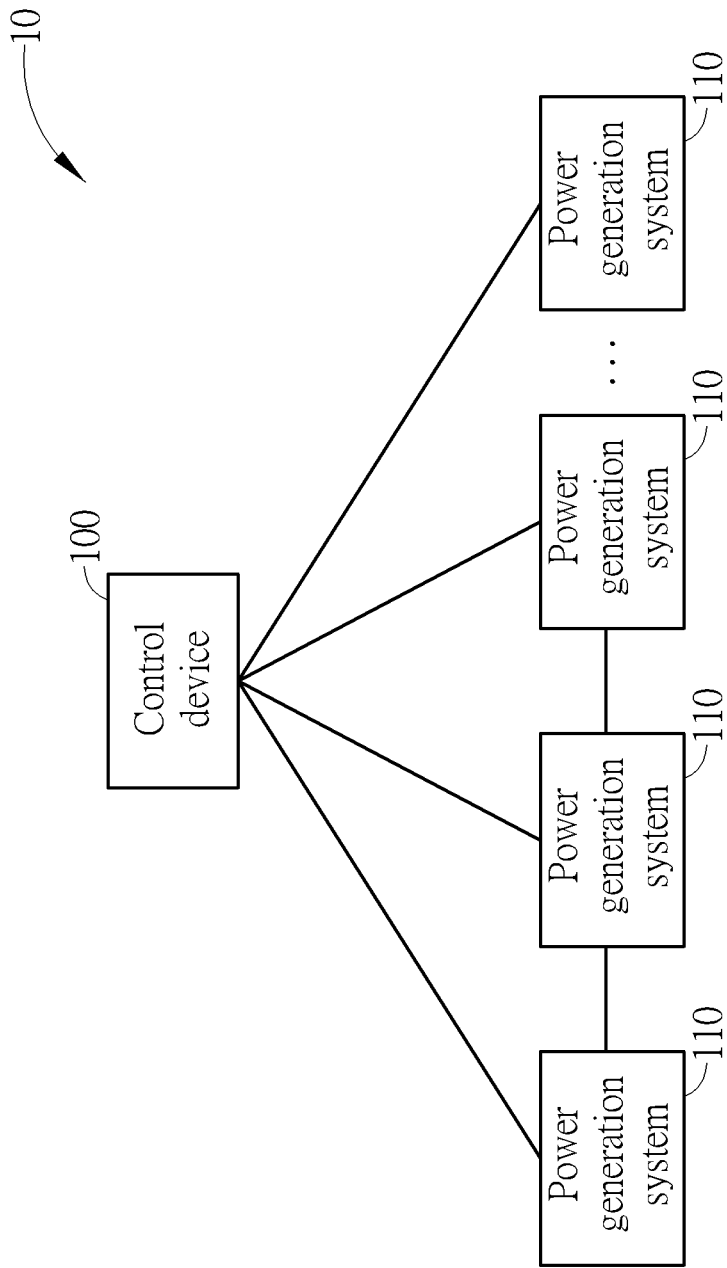
FIG. 1 is a schematic diagram of a power network according to an example of the present invention.

FIG. 1 is a schematic diagram of a power network 10 according to an example of the present invention. As shown in FIG. 1, the power network 10 includes a control device 100 and at least one power generation system 110. In one example, the control device 100 may receive environmental data from the at least one power generation system 110. According to (e.g., by using) the environmental data, the control device 100 may generate (e.g., calculate or compute) a control strategy, and may transmit the control strategy to the at least one power generation system 110. According to the control strategy, the at least one power generation system 110 may generate (e.g., output) a power. In one example, a part of the at least one power generation system 110 may be placed in the same location (e.g., geographic location) and/or another part of the at least one power generation system 110 may be placed in different location(s). In one example, the at least one power generation system 110 may be placed below a ground level. In one example, the control device 100 and the at least the power generation system 110 may communicate with each other (e.g., transmit the control strategy or a value of the power) via communication standards used for Internet of Things (IoT) (e.g., Taiwan Smart Energy Industry Association (TaiSEIA) and/or later standards)). In one example, the at least the power generation system 110 may communicate with each other (e.g., transmit stored power)) via communication standards for smart grids (e.g., IEC 61850 and/or later standards).

Figure 2:
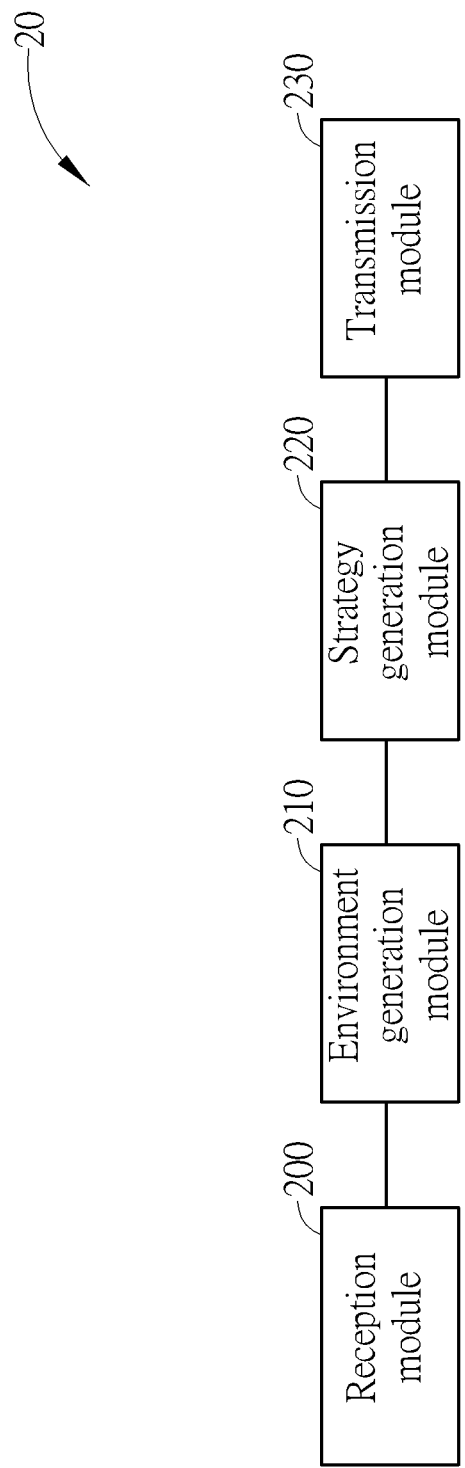
FIG. 2 is a schematic diagram of a control device according to an example of the present invention.

FIG. 2 is a schematic diagram of a control device 20 according to an example of the present invention, which may be used for realizing the control device 100 in FIG. 1. The control device 20 may be used for controlling a power generation system (e.g., the at least one power generation system 110 in FIG. 1). As shown in FIG. 2, the control device 20 may include a reception module 200, an environment generation module 210, a strategy generation module 220 and a transmission module 230. In detail, the reception module 200 may be used for receiving environmental data from the power generation system. The environment generation module 210 may be coupled to the reception module 200, and may be used for generating (e.g., calculating, computing or iterating) an environment state of the power generation system 110 according to the environment data and an environment model. The strategy generation module 220 may be coupled to the environment generation module 210. The strategy generation module 220 may be used for generating (e.g., a value of) a power of the power generation system according to the environmental state, and may be used for generating a control strategy of the power generation system according to (e.g., the value of) the power. The transmission module 230 may be coupled to the strategy generation module, and may be used for transmitting the control strategy to the power generation system.

In one example, the control device 20 may receive the environmental data from a weather bureau (e.g., Central Weather Bureau (CWB)). That is, the control device 20 may receive the environmental data from the weather bureau and the power generation system. In one example, the environmental data may include at least one information of the following information: an environmental temperature (e.g., of a geographical location) of the power generation system, an environmental humidity of the power generation system, an environmental air pressure of the power generation system, an environmental topography of the power generation system or an environmental shelter information of the power generation system. In one example, the environmental temperature may be in the range of 0 degrees Celsius (° C.) to 100° C., e.g., 32° C., but is not limited thereto. In one example, the environmental humidity may be in the range of 0% to 100%, e.g., 40%, but is not limited thereto. In one example, the environmental air pressure may be in the range of 620 hPa to 1013 hPa, e.g., 1013 hPa, but is not limited thereto. In one example, the environmental topography may include plains, plateaus, highlands or mountains, but is not limited thereto. In one example, the environmental shelter information may include buildings or natural landscapes, e.g., tall buildings, viaducts, mountains or combinations thereof, but is not limited thereto.

In one example, the environment model may include at least one algorithm of a climate prediction algorithm or a light source efficiency algorithm. In one example, the climate prediction algorithm may be used for predicting a climate in a future time period. The future time period may include N time units, wherein N may be a positive integer. The time unit may include a second, a minute, an hour or combinations thereof. For example, the climate prediction algorithm may be used for predicting the climate in the next 6 hours, when N is 6 and the time unit is an hour. In one example, the light source efficiency algorithm may be used for predicting an intensity of a light source (e.g., 2 megajoules (MJ)/square meter ($m^2$), but is not limited thereto) or an incident angle of the light source (e.g., an altitude angle of 60 degrees (°) or an azimuth angle of 90°, but is not limited thereto). In one example, the environmental state may include at least one information of the following information: an environmental wind speed (e.g., 5 meters (m)/second (s), but is not limited thereto), an environmental sunlight intensity (e.g., 2 $MJ/m^2$), an environmental light source incident angle (e.g., an altitude angle of 60° or an azimuth angle of 90°, but is not limited thereto) or an environmental rainfall (e.g., 2 millimeter (mm)/hour (h), but is not limited thereto). That is, the control device 20 may generate the environmental state of the power generation system by using the environmental data and the environmental model (e.g., substituting or iterating the environmental data into the environmental model).

In one example, the power generation system may include at least one power generation module, and the control strategy may indicate the power generation system to control the at least one power generation module. In one example, the power generation system controlling the at least one power generation module may include that the power generation system activates at least one first power generation module of the at least one power generation module. In one example, the power generation system controlling the at least one power generation module may include that the power generation system deactivates (e.g., stops activating) at least one second power generation module of the at least one power generation module. The at least one first power generation module and the at least one second power generation module may be the same or different. In one example, the at least one power generation module may include a lifting platform and at least one power generation device. In one example, the at least one power generation device may include at least one of a solar power generation device, a wind power generation device or a hydropower generation device. In one example, the at least one power generation device may include a power generation device which generates power via renewable energy, e.g., a tidal power generation device, a geothermal power generation device or a biogas power generation device, but is not limited thereto.

Figure 3:
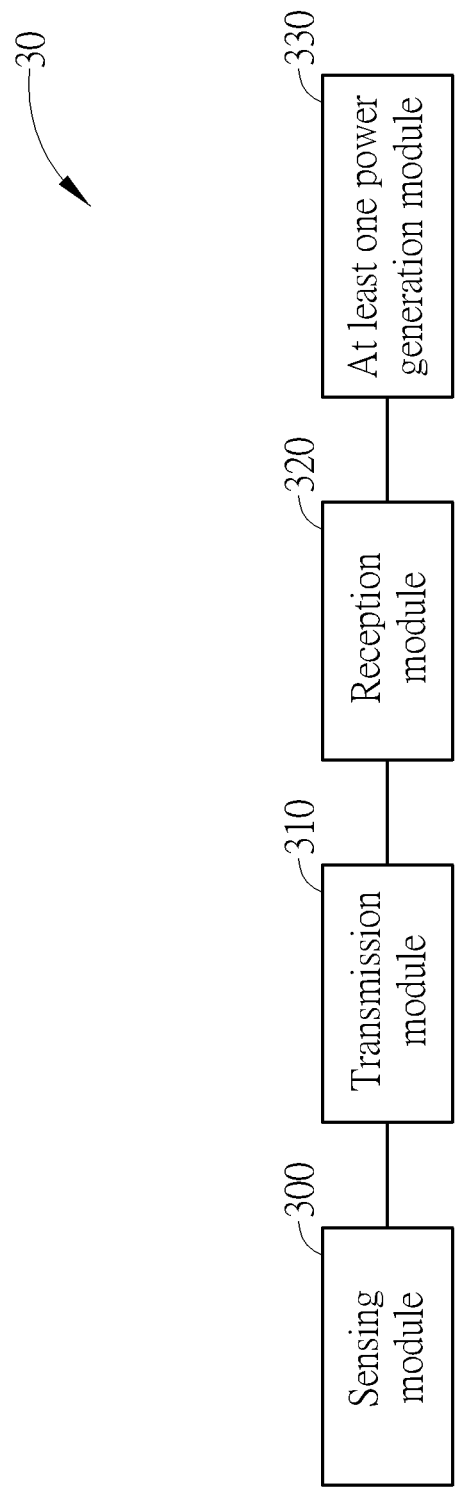
FIG. 3 is a schematic diagram of a power generation system according to an example of the present invention.

FIG. 3 is a schematic diagram of a power generation system 30 according to an example of the present invention, which may be used for realizing the at least one power generation system 110 in FIG. 1. The power generation system 30 may be used for generating a power. As shown in FIG. 3, the power generation system 30 may include a sensing module 300, a transmission module 310, a receiving module 320 and at least one power generation module 330. The at least one power generation module 330 may include a lifting platform and at least one power generation device. In detail, the sensing module 300 may be used for sensing environmental data. The transmission module 310 may be coupled to the sensing module 300, and may be used for transmitting the environmental data to a control device (e.g., the control device 100 in FIG. 1). The reception module 320 may be coupled to the transmitting module 310, and may be used for receiving a control strategy from the control device. The at least one power generation module 330 may be coupled to the receiving module 320, and may be used for generating the power according to the control strategy.

In one example, the sensing module 300 may include sensors for sensing the environmental data, e.g., an environmental temperature sensor for sensing the environmental temperature, an environmental humidity sensor for sensing the environmental humidity, an environmental air pressure sensor for sensing the environmental air pressure, an environmental wind speed sensor for sensing the environmental wind speed, an environmental topography sensor for sensing the environmental topography, an environmental shelter sensor for sensing the environmental shelter or combinations thereof, but is not limited thereto. In one example, operations of the at least one power generation module 330 generating the power according to the control strategy may include: the at least one power generation module 330 activates a first power generation device of the at least one power generation device. In one example, operations of the at least one power generation module 330 activates the first power generation device of the at least one power generation device may include: the lifting platform raises the first power generation device above the ground level and drives the first power generation device to be unfolded, and the first power generation device generates the power. In one example, the first power generation device may include (e.g., be) at least one of a solar power generation device, a wind power generation device and a hydropower generation device. In one example, the first power generation device may include (e.g., be) a power generation device which generates power via the renewable energy, e.g., a tidal power generation device, a geothermal power generation device or a biogas power generation device, but is not limited thereto.

In one example, when the first power generation device includes (e.g., is) the solar power generation device, the first power generation device may include solar panels, brackets and a central support column, but is not limited thereto. In one example, the number of the solar panels may be one or more, e.g., 16, but is not limited thereto. In one example, operations of the lifting platform driving the first power generation device to be unfolded may include: the lifting platform drives the central support column of the solar power generation device (e.g., via a planar four-bar linkage thereof) to automatically unfold the solar panels and the brackets via a driver (e.g., a direct current (DC) drive) used for the solar power generation device, but is not limited thereto.

In one example, when the first power generation device includes (e.g., is) the wind power generation device, the first power generation device may include fan blades, brackets, rotors and a central support column, but is not limited thereto. In one example, operations of the lifting platform driving the first power generation device to be unfolded may include: the lifting platform drives the central support column of the wind power generation device (e.g., via a planar slide six-bar linkage thereof) to automatically unfold the fan blades and the brackets via the driver used for the wind power generation device, but is not limited thereto.

In one example, when the first power generation device includes (e.g., is) the hydropower power generation device, the first power generation device may include a water collecting plate, a water collecting hole, fan blades and a central support column, but is not limited thereto, where the fan blades may be placed in the central support column. In one example, operations of the lifting platform driving the first power generation device to be unfolded may include: the lifting platform drives the central support column of the hydropower power generation device (e.g., via the planar slide six-bar linkage thereof) to automatically unfold the water collecting plate and the water collecting hole and water (e.g., rainwater) collected by the water collecting plate and the water collecting hole is automatically being guided into the central support column, and automatically generates a power via the fan blades, but is not limited thereto.

In one example, the at least one power generation module 330 may stop generating the power according to the control strategy. In one example, operations of the at least one power generation module 330 stopping generating the power according to the control strategy may include: the at least one power generation module 330 deactivates a second power generation device of the at least one power generation device. The first power generation device and the second power generation device may be the same or different. In one example, an operation of the at least one power generation module 330 deactivating the second power generation device of the at least one power generation device may include: the lifting platform drives the second power generation device to be folded and lowers the second power generation device below the ground level, and the second power generation device stops generating the power. In one example, the second power generation device may include (e.g., be) at least one of the solar power generation device, the wind power generation device and the hydropower generation device. In one example, the second power generation device may include (e.g., be) a power generation device which generates power via the renewable energy, e.g., a tidal power generation device, a geothermal power generation device or a biogas power generation device, but is not limited thereto.

In one example, when the second power generation device includes (e.g., is) a solar power generation device, the second power generation device may include solar panels, brackets and a central support column. In one example, operations of the lifting platform driving the first power generation device to be folded may include: the lifting platform drives the central support column of the solar power generation device (e.g., via the planar four-bar linkage thereof) to automatically fold the solar panels and the brackets via the driver for the solar power generation device, but is not limited thereto. In one example, the solar panels and the brackets may be folded (e.g., neatly stacked) on the central support column. In one example, after the lifting platform drives the solar power generation device to be folded, the solar power generation device may be folded as a column (e.g., round column or square column) device, and the lifting platform lowers the folded solar power generation device below the ground level.

In one example, when the second power generation device includes (e.g., is) a wind power generation device, the second power generation device may include fan blades, brackets, rotors and a central support column, but is not limited thereto. In one example, operations of the lifting platform driving the second power generation device to be folded may include: the lifting platform drives the central support column of the wind power generation device (e.g., via the planar slide six-bar linkage thereof) to automatically stop rotating the rotor and automatically fold the fan blades and the brackets via the DC driver for the wind power generation device, but is not limited thereto. In one example, the fan blades and the brackets may be folded (e.g., neatly stacked) on sides (e.g., around) of the support column. In one example, after the lifting platform drives the wind power generation device to be folded, the wind power generation device may be folded as a column (e.g., round column or square column) device, and the lifting platform lowers the folded wind power generation device below the ground level.

In one example, when the second power generation device includes (e.g., is) a hydropower power generation device, the second power generation device may include a water collecting plate, a water collecting hole, fan blades and a central support column, but is not limited thereto, where the fan blade may be set in the central support column. In one example, operations of the lifting platform driving the hydropower power generation device to be folded may include: the lifting platform drives the central support column of the hydropower power generation device (e.g., via the planar four-bar linkage thereof) to automatically fold the water collecting plate and the water collecting hole via the DC driver for the hydropower power generation device, but is not limited thereto. In one example, the water collecting plate may be folded (e.g., neatly stacked) on sides (e.g., around) of the central support column. In one example, after the lifting platform drives the hydropower power generation device to be folded, the hydropower power generation device may be folded as a column (e.g., round column or square column) device, and the lifting platform lowers the folded hydropower power generation device below the ground level.

In one example, the transmission module 310 of the power generation system 30 may transmit (e.g., a value of) the power of the at least one power generation module 330 to the control device. According to the received generated power, the control device may perform a mechanical learning (e.g., an algorithm which substitutes or iterates the generated power into the environmental model), and may update the environmental model. In one example, the control device may generate (e.g., calculate, compute or iterate) the environment state of the power generation system 110 more accurately via the updated environment model.

In one example, the lifting platform may include a screw lifting system. The screw lifting system may have characteristics of a maximizing torque and a unidirectional driving. When the lifting platform includes (e.g., is) the screw lifting system, according to the characteristics of the screw lifting system, when the lifting platform raises or lowers one of the at least one power generating device (e.g., the first power generating device or the second power generating device) to a specific height, the power generation device may be fixed (e.g., may not be moved). As a result, the at least one power generating device may be fixed without using a fixing device (e.g., a drive rotor fixing device).

In one example, the power generation system 30 may receive the (e.g., a value of) a power corresponding to the control strategy indicated by the control device from the control device. In one example, the power generation system 30 may include a power generation storage device. When (e.g., a value of) the power generated by the power generation system 30 is greater than (e.g., the value of) the power corresponding to the control strategy indicated by the control device, the power generation system 30 may store (e.g., input) additional power in the power generation storage device. In one example, when another power generation system is in a power shortage situation (e.g., (e.g., a value of) a power generated by the other power generation system is smaller than (e.g., the value of) the power corresponding to the control strategy indicated by the control device) or when the other power generation system has emergency power supply needs but the power generated by the other power generation system is not sufficient to supply the needs), the power generation system 30 may obtain information about the power shortage situation of the other power generation system and the power generation system 30 may transmit the power stored in the power generation storage device to the other power generation system via a smart grid (e.g., the control device thereof or other power generation system(s)).

Figure 4:
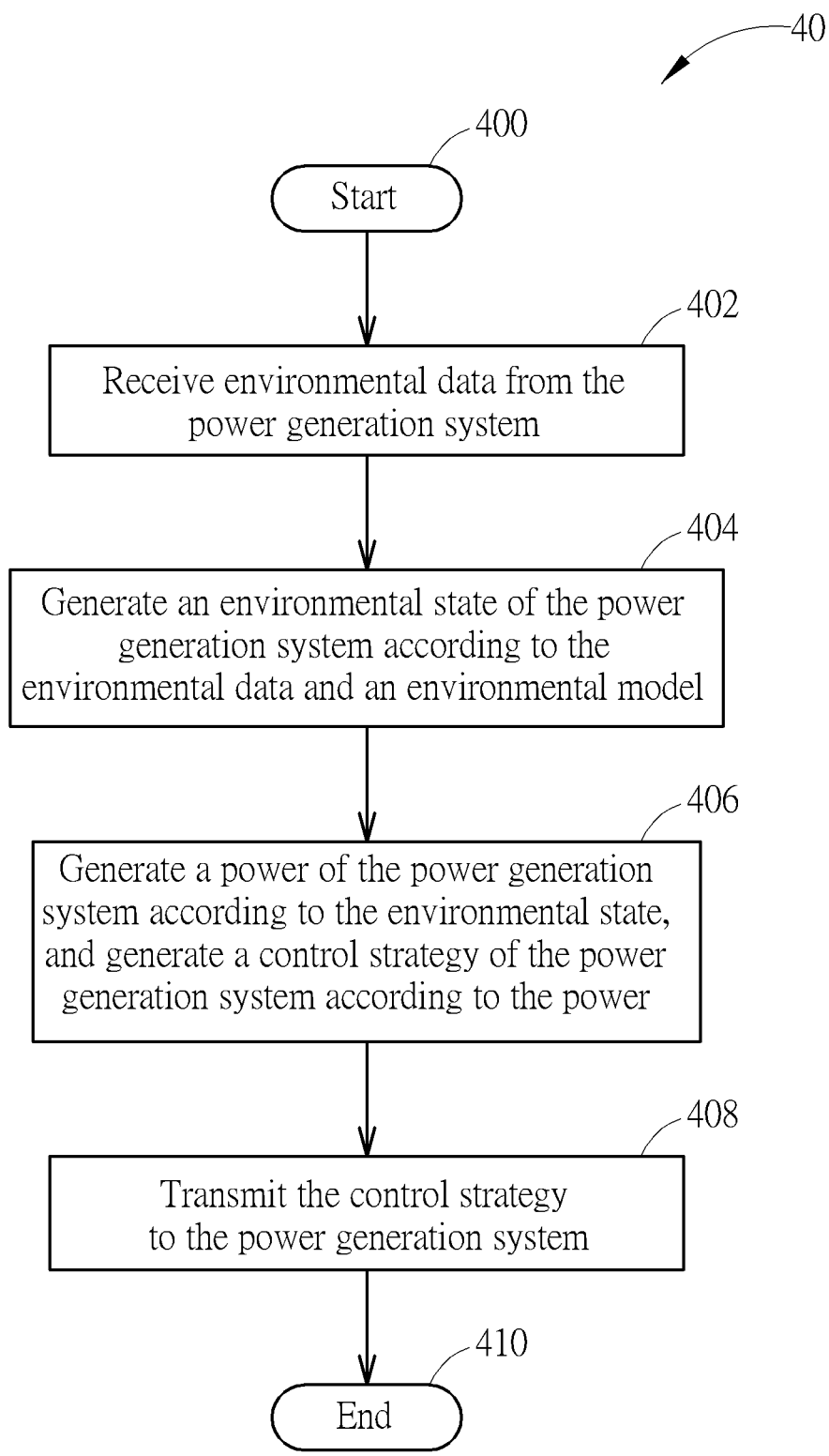
FIG. 4 is a flowchart of a process according to an example of the present invention.

Operations of the control device 20 in the above examples can be summarized into a process 40 shown in FIG. 4. The process 40 includes the following steps:
Step 400: Start.
Step 402: Receive environmental data from the power generation system.
Step 404: Generate an environment state of the power generation system according to the environment data and an environment model.
Step 406: Generate a power of the power generation system according to the environmental state, and generate a control strategy of the power generation system according to the power.
Step 408: Transmit the control strategy to the power generation system.
Step 410: End.

Figure 5:
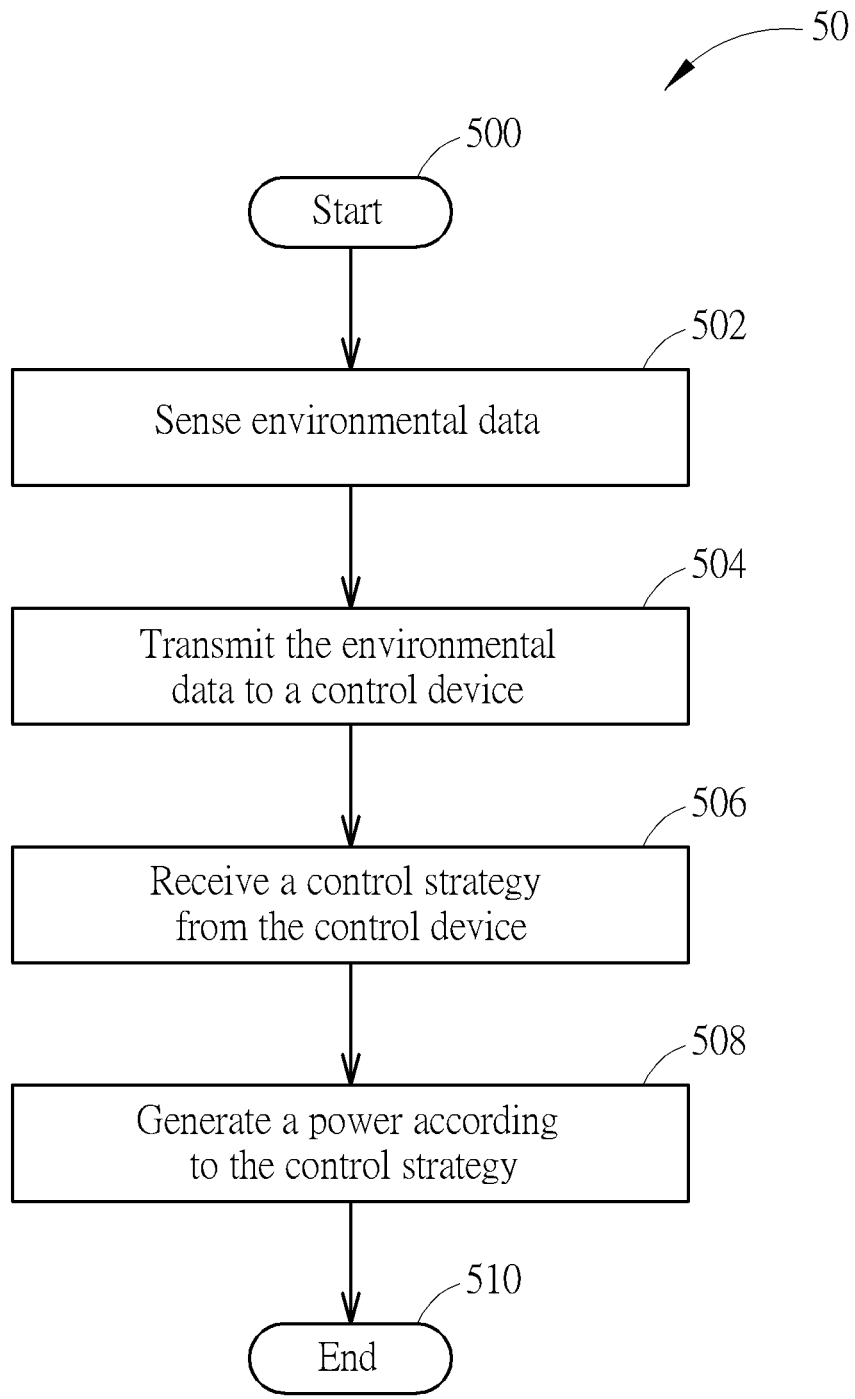
FIG. 5 is a flowchart of a process according to an example of the present invention.

Operations of the power generation system 30 in the above examples can be summarized into a process 50 shown in FIG. 5. The process 50 includes the following steps:
Step 500: Start.
Step 502: Sense environmental data.
Step 504: Transmit the environmental data to a control device.
Step 506: Receive a control strategy from the control device.
Step 508: Generate a power according to the control strategy.
Step 510: End.

Figure 6:
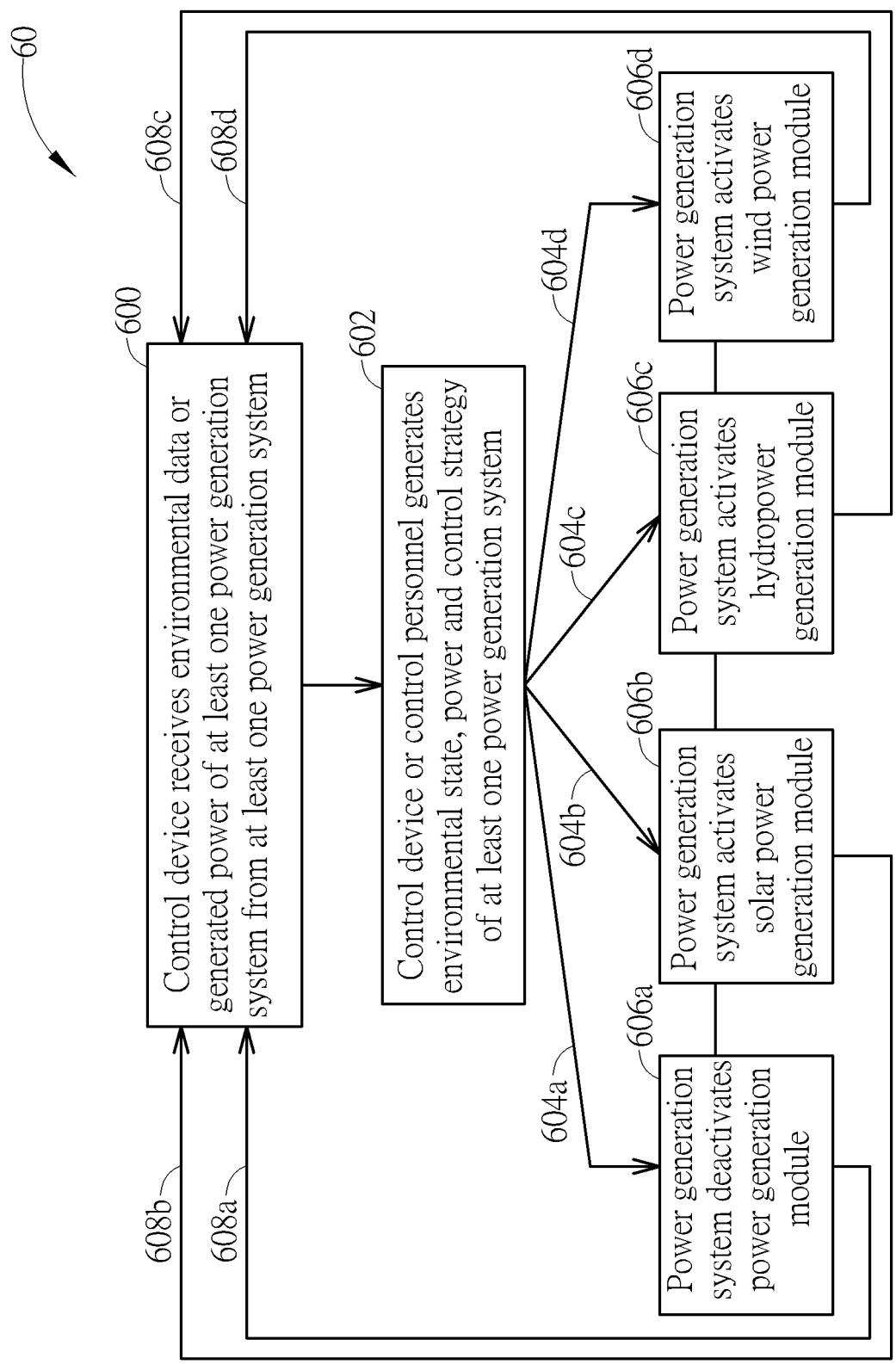
FIG. 6 is a flowchart of a process of a control device controlling at least one power generation system according to an example of the present invention.

FIG. 6 is a process 60 of a control device controlling at least one power generation system according to an example of the present invention, and may be used for realizing the power network 10 in FIG. 1, the control device 20 in FIG. 2 and the power generation system 30 in FIG. 3. As shown in FIG. 6, at Step 600, the control device 20 receives environmental data or (e.g., a value of) a generated power of the at least one power generation system 110 from the at least one power generation system 110. At Step 602, the control device 20 or a control personnel generates an environmental state of a first power generation system of the at least one power generation system 110 is "severe climate", and generates (e.g., a value of) a power and a control strategy of (e.g., for) the first power generation system accordingly, wherein the control strategy includes "deactivating power generation module". The control device 20 or the control personnel generates an environmental state of a second power generation system of the at least one power generation system 110 is "sunny", and generates (e.g., a value of) a power and a control strategy of the second power generation system accordingly, wherein the control strategy includes "activating solar power generation module". The control device 20 or the control personnel generates an environmental state of a third power generation system of the at least one power generation system 110 is "abundant rainfall", and generates (e.g., a value of) a power and a control strategy of the third power generation system accordingly, wherein the control strategy includes "activating hydropower generation module". The control device 20 or the control personnel generates an environmental state of a fourth power generation system of the at least one power generation system 110 is "stable air volume", and generates (e.g., a value of) a power and a control strategy of the fourth power generation system accordingly, wherein the control strategy includes "activating wind power generation module".

At Step 604a, the control device 20 or the control personnel transmits the control strategy of the "deactivating power generation module" to the first power generation system. At Step 606a, the first power generation system deactivates all power generation devices of the at least one power generation module according to the control strategy of the "deactivating power generation module. At Step 608a, the first power generation system may transmit (e.g., a value of, e.g., 0 thousand watts (kWh)) the power generated by deactivating the at least one power generation module to the control device. At Step 604b, the control device 20 or the control personnel transmits the control strategy of the "activating solar power generation module" to the second power generation system. At Step 606b, the second power generation system activates a solar power generation device of the at least one power generation module according to the control strategy of the "activating solar power generation module. At Step 608b, the second power generation system may transmit (e.g., a value of) the power generated by activating the solar power generation device to the control device. According to (e.g., the value of) received power, the control device may perform a mechanical learning and may update the environmental model.

At Step 604c, the control device 20 or the control personnel transmits the control strategy of the "activating hydropower generation module" to the third power generation system. At Step 606c, the third power generation system activates a hydropower generation device of the at least one power generation module according to the control strategy of the "activating hydropower generation module. At Step 608c, the third power generation system may transmit (e.g., a value of) the power generated by activating the hydropower generation device to the control device. According to (e.g., the value of) received power, the control device may perform the mechanical learning and may update the environmental model. At Step 604d, the control device 20 or the control personnel transmits the control strategy of the "activating wind power generation module" to the fourth power generation system. At Step 606d, the fourth power generation system activates a wind power generation device of the at least one power generation module according to the control strategy of the "activating wind power generation module. At Step 608d, the fourth power generation system may transmit (e.g., a value of) the power generated by activating the wind power generation device to the control device. According to (e.g., the value of) received power, the control device may perform the mechanical learning and may update the environmental model.

Figure 7:
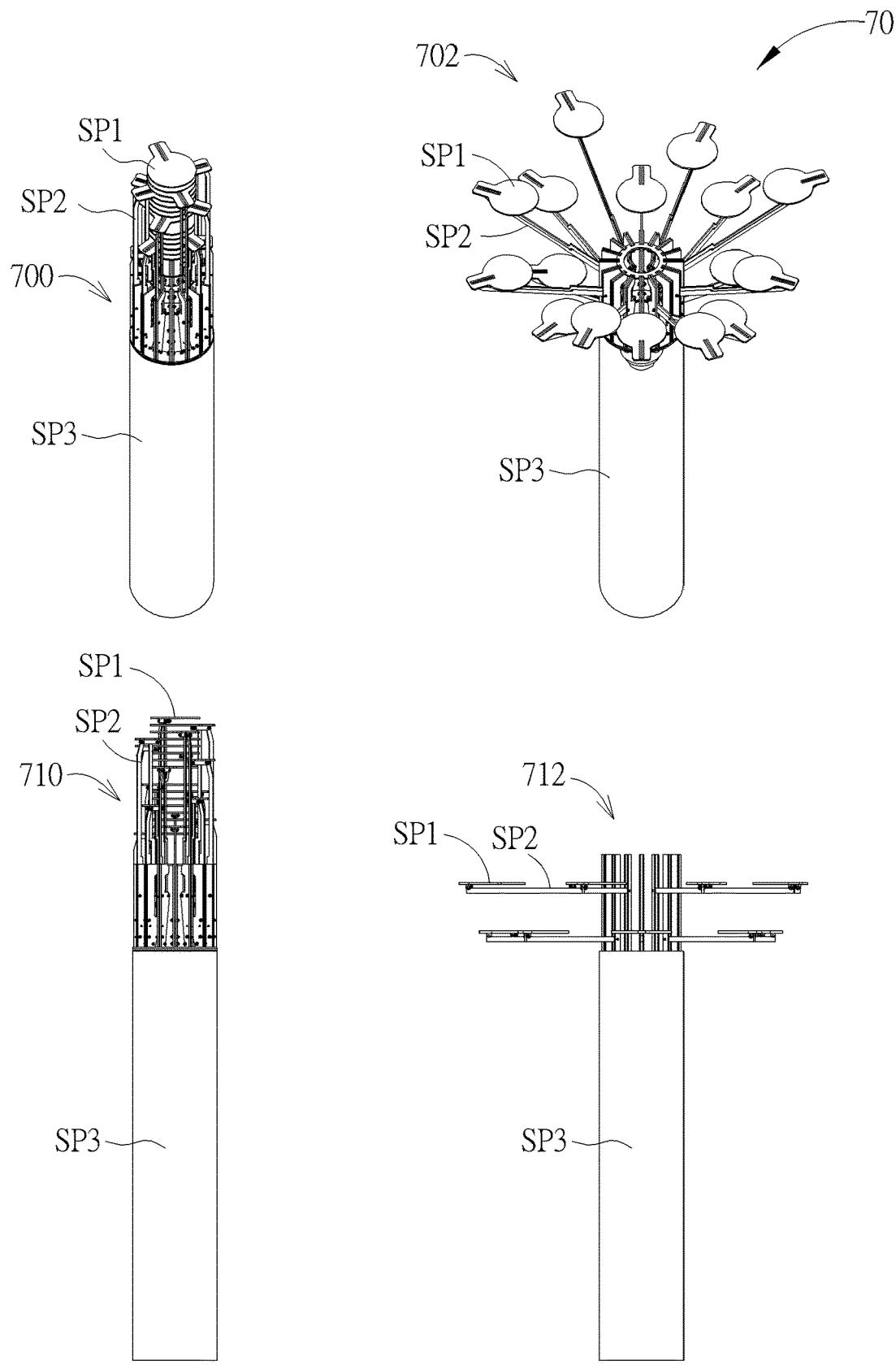
FIG. 7 is a schematic diagram of a solar power generation device according to an example of the present invention.

FIG. 7 is a schematic diagram of a solar power generation device 70 according to an example of the present invention, and may be used for realizing the power network 10 in FIG. 1 and the at least one power generation module 330 in FIG. 3, for generating a power. In FIG. 7, a side-top view 700 of a folded mode, a side-top view 702 of an unfolded mode, a side view 710 of a folded mode and a side view 712 of an unfolded mode of a solar power generation device 70 are illustrated. As shown in the side-top view 700 of the folded mode, the side-top view 702 of the unfolded mode, the side view 710 of the folded mode and the side view 712 of the unfolded mode, the solar power generation device 70 may include solar panels SP1, brackets SP2 and a central support column SP3. The central support column SP3 may include a planar four-bar linkage, which may be used for unfolding the solar panels SP1 and the brackets SP2.

The lifting platform drives the central support column SP3 (e.g., via a planar four-bar linkage thereof) to automatically unfold the solar panels SP1 and the brackets SP2 via a driver for the solar power generation device 70, when the lifting platform drives the solar power generation device 70 to be unfolded (e.g., switching from the folded mode to the unfolded mode). On the other hand, the lifting platform drives the central support column SP3 (e.g., via the planar four-bar linkage thereof) to automatically fold (e.g., collapse) the solar panels SP1 and the brackets SP2 (e.g. neatly stacked) on the central support column SP3 via the driver for the solar power generation device 70, when the lifting platform drives the solar power generation device 70 to be folded (e.g., switching from the unfolded mode to the folded mode).

Figure 8:
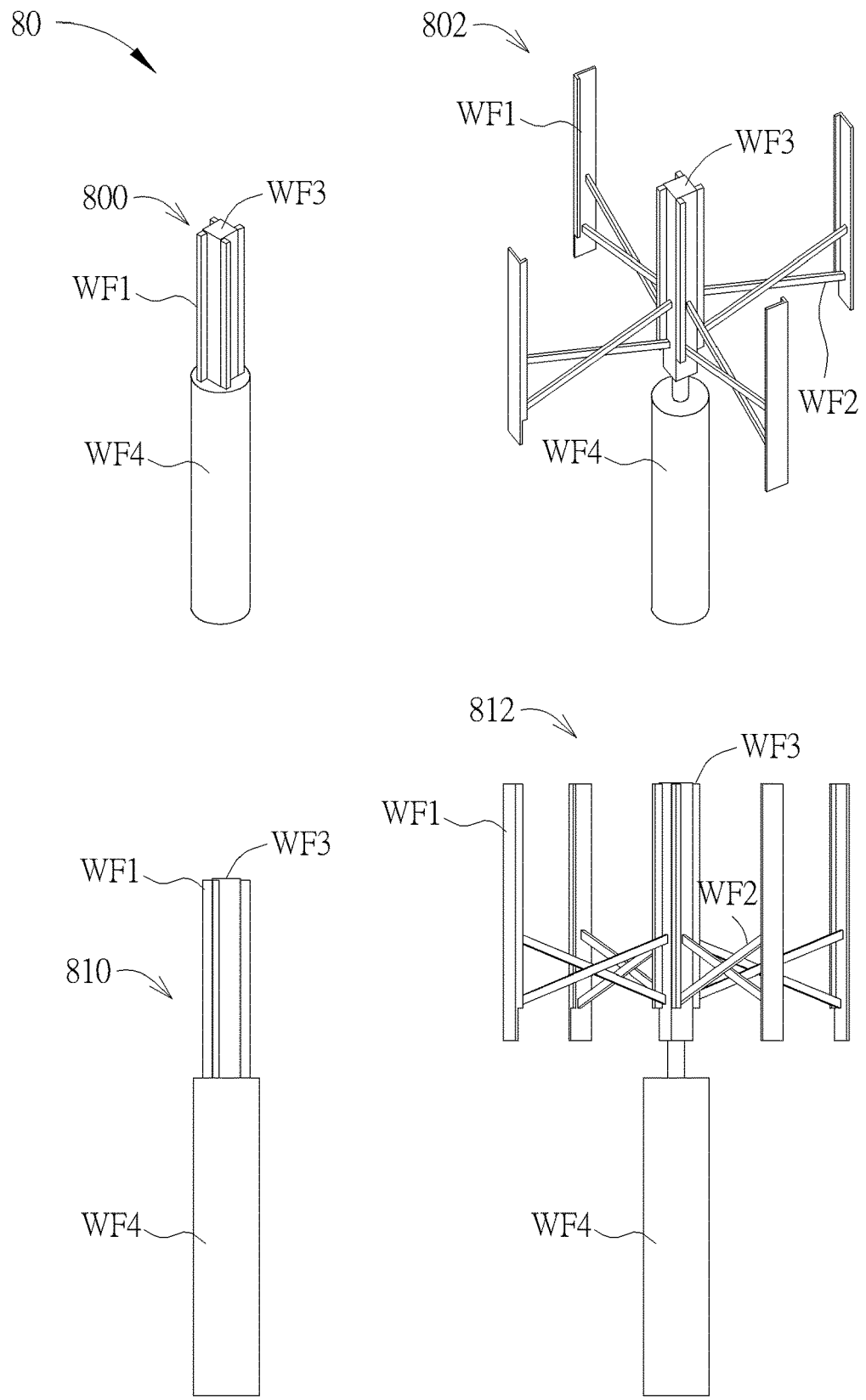
FIG. 8 is a schematic diagram of a wind power generation device according to an example of the present invention.

FIG. 8 is a schematic diagram of a wind power generation device 80 according to an example of the present invention, may be used for realizing the power network 10 in FIG. 1 and the at least one power generation module 330 in FIG. 3, for generating a power. In FIG. 8, a side-top view 800 of a folded mode, a side-top view 802 of an unfolded mode, a side view 810 of a folded mode and a side view 812 of an unfolded mode of a wind power generation device 80 are illustrated. As shown in the side-top view 800 of the folded mode, the side-top view 802 of the unfolded mode, the side view 810 of the folded mode and the side view 812 of the unfolded mode, the wind power generation device 80 may include fan blades WF1, brackets WF2, a rotor WF3 and a central support column WF4. It should be noted that, in the side-top view 800 of the folded mode and the side view 810 of the folded mode, since the bracket WF2 is folded between the fan blades WF1 and the rotor WF3, the bracket WF2 is not labeled in the side-top view 800 of the folded mode and the side view 810 of the folded mode.

The lifting platform drives the central support column WF4 (e.g., via a planar slide six-bar linkage) to automatically unfold the fan blades WF1 and the brackets WF2 and automatically rotate the rotor WF3 via a driver for the wind power generation device 80, when the lifting platform drives the wind power generation device 80 to be unfolded (e.g., switching from the folded mode to the unfolded mode). On the other hand, the lifting platform drives the central support column WF4 (e.g., via the planar slide six-bar linkage) to automatically stop rotating the rotor WF3 and automatically fold (e.g., collapse) the fan blades WF1 and the brackets WF2 (e.g. neatly stacked) on sides of the rotor WF3 via the driver for the wind power generation device 80, when the lifting platform drives the wind power generation device 80 to be folded (e.g., switching from the unfolded mode to the folded mode).

Figure 9:
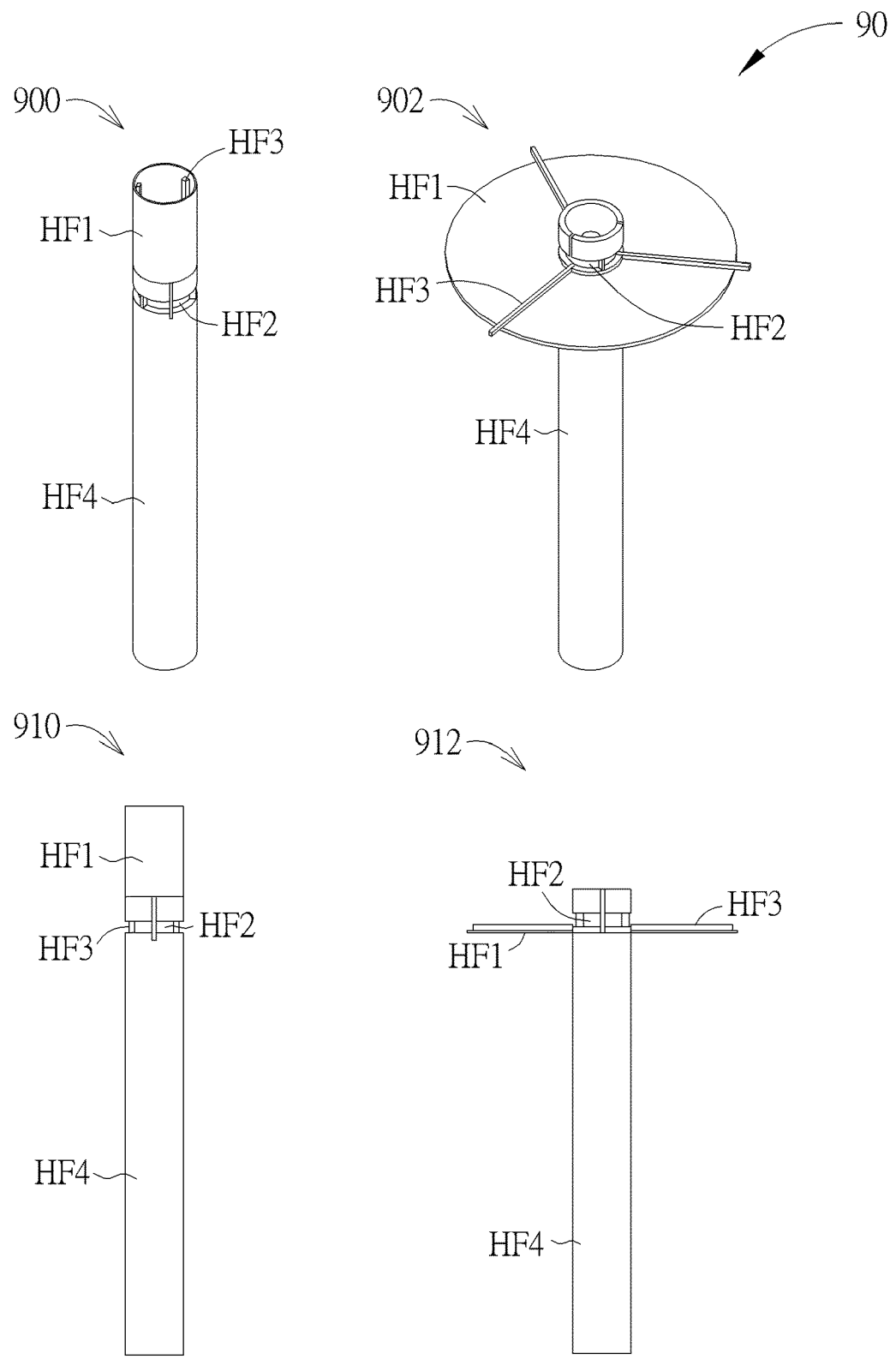
FIG. 9 is a schematic diagram of a hydropower generation device according to an example of the present invention.

FIG. 9 is a schematic diagram of a hydropower generation device 90 according to an example of the present invention, may be used for realizing the power network 10 in FIG. 1 and the at least one power generation module 330 in FIG. 3, for generating a power. In FIG. 9, a side-top view 900 of a folded mode, a side-top view 902 of an unfolded mode, a side view 910 of a folded mode and a side view 912 of an unfolded mode of a hydropower generation device 90 are illustrated. As shown in the side-top view 900 of the folded mode, the side-top view 902 of the unfolded mode, the side view 910 of the folded mode and the side view 912 of the unfolded mode, the hydropower generation device 90 may include a water collecting plate HF1, a water collecting hole HF2, water collecting plate brackets HF3 and a central support column HF4.

The lifting platform drives the central support column HF4 (e.g., via a planar four-bar linkage) to automatically unfold the water collecting plate HF1 and the water collecting plate brackets HF3, to automatically guide water (e.g., rainwater) collected by the water collecting plate HF1, the water collecting plate brackets HF3 and/or the water collecting hole HF2 into the central support column HF4, and to automatically generate a power via the fan blades in the central support column HF4. On the other hand, the lifting platform drives the central support column HF4 (e.g., via the planar four-bar linkage) to automatically fold (e.g., collapse) the water collecting plate HF1 and the water collecting plate brackets HF3 (e.g. neatly stacked) on the central support column HF4 via the driver for the hydropower generation device 90, when the lifting platform drives the hydropower generation device 90 to be folded (e.g., switching from the unfolded mode to the folded mode). The hydropower generation device 90 is folded as a cylindrical device.

Figure 10:
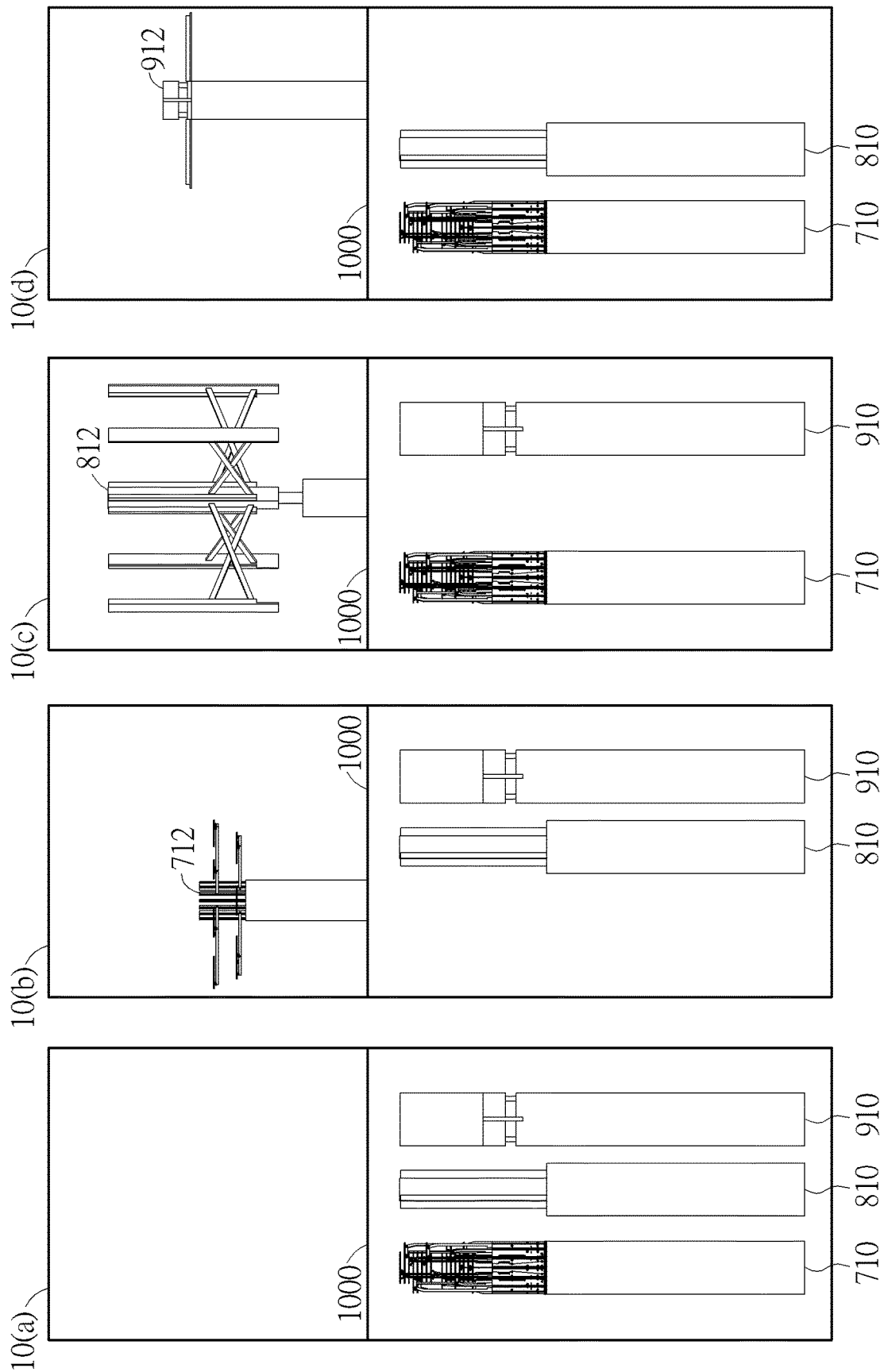
FIG. 10 is a schematic diagram of a power generation system controlling at least one power generation module according to an example of the present invention.

FIG. 10 is a schematic diagram of a power generation system controlling at least one power generation module according to an example of the present invention, may be used for realizing the power network 10 in FIG. 1, the at least one power generation module 330 in FIGS. 3 and 606a-606d in FIG. 6, for generating a power. In FIG. 10, four scenes 10(a)-10(d) are illustrated. In scenes 10(a)-10(d), a power generation system including a ground level 1000 and a folded solar power generation device (represented by the side view 710 of the folded mode of the solar power generation device 70), a folded wind power generation device (represented by the side view 810 of the folded mode of the wind power generation device 80) and a folded hydropower generation device (represented by the side view 910 of the folded mode of the hydropower generation device 90) are illustrated. The scene 10(a) illustrates that the power generation system is placed below the ground level. In one example, when the power generation system does not activate the power generation module, the folded solar power generation device, the folded wind power generation device and/or the folded hydropower generation device are maintained below the ground level. In another example, when the power generation system deactivates the power generation module, the folded solar power generation device, the folded wind power generation device and/or the folded hydropower generation device are maintained below the ground level, the unfolded solar power generation device, the unfolded wind power generation device and/or the unfolded hydropower generation device are lowered below the ground level. The example may be corresponding to Step 606a.

The scene 10(b) illustrates that a solar power generation system (represented by the side view 712 of the unfolded mode of the solar power generation device 70) rises above the ground level and is unfolded. When the power generation system activates the solar power generation module, the folded solar power generation device rises above the ground level, the folded wind power generation device and/or the folded hydropower generation device are maintained below the ground level, and the unfolded wind power generation device and/or the unfolded hydropower generation device are lowered below the ground level. The example may be corresponding to Step 606b.

The scene 10(c) illustrates that a wind power generation system (represented by the side view 812 of the unfolded mode of the wind power generation device 80) rises above the ground level and is unfolded. In one example, when the power generation system activates the wind power generation module, the folded wind power generation device rises above the ground level, the folded solar power generation device and/or the folded hydropower generation device are maintained below the ground level, and the unfolded solar power generation device and/or the unfolded hydropower generation device are lowered below the ground level. The example may be corresponding to Step 606d.

The scene 10(d) illustrates that a hydropower generation system (represented by the side view 912 of the unfolded mode of the hydropower generation device 90) rises above the ground level and is unfolded. In one example, when the power generation system activates the hydropower generation module, the folded hydropower generation device rises above the ground level, the folded solar power generation device and/or the folded wind power generation device are maintained below the ground level, and the unfolded solar power generation device and/or the unfolded wind power generation device are lowered below the ground level. The example may be corresponding to Step 606c.

Figure 11:
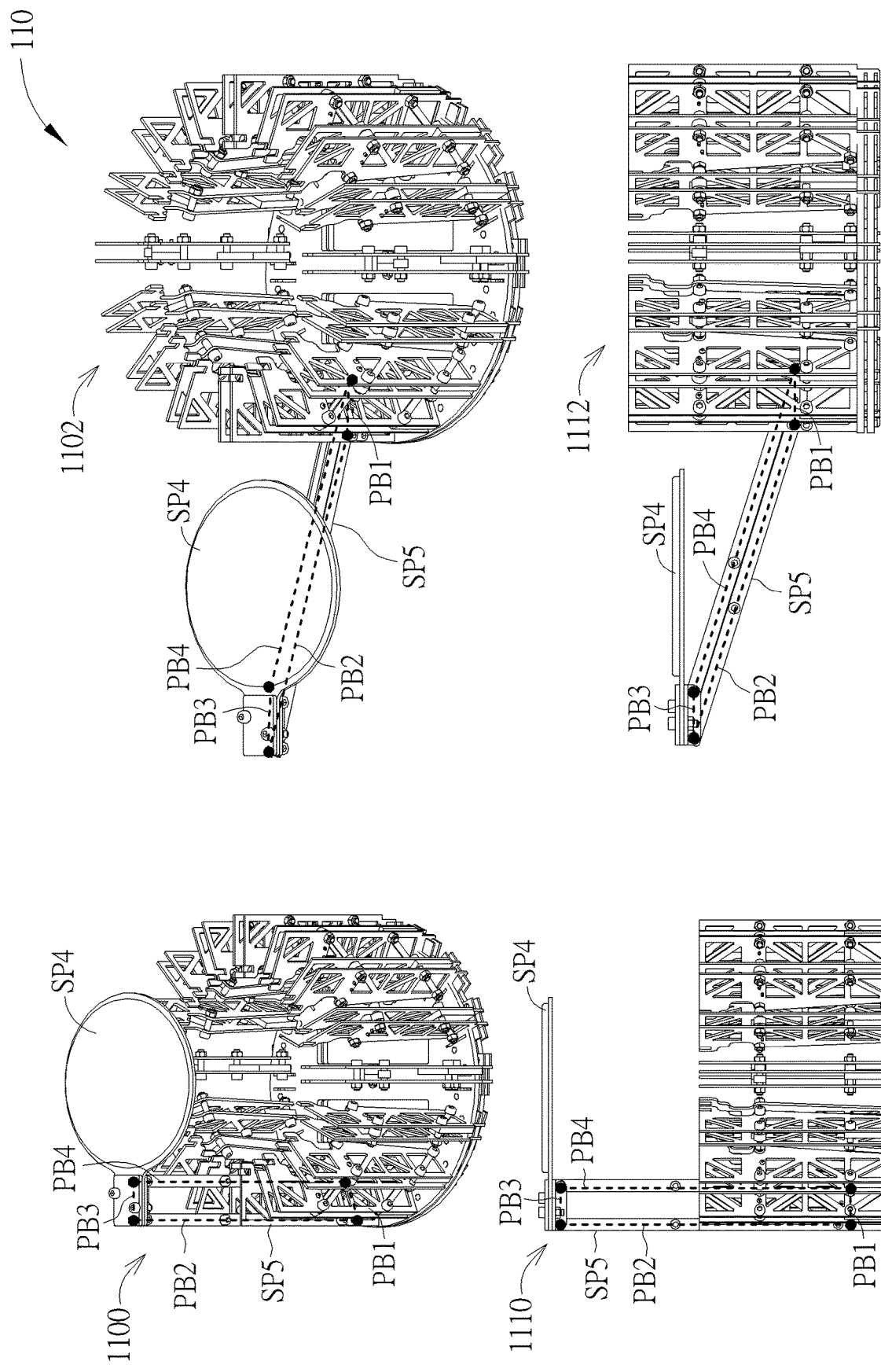
FIG. 11 is a schematic diagram of a solar power generation device according to an example of the present invention.

FIG. 11 is a schematic diagram of a solar power generation device 110 according to an example of the present invention, and may be used for realizing the solar power generation device 70 in FIG. 7. In FIG. 11, a side-top view 1100 of a folded mode, a side-top view 1102 of an unfolded mode, a side view 1110 of a folded mode and a side view 1112 of an unfolded mode of a solar power generation device 110 are illustrated. Similar to the solar power generation device 70, the solar power generation device 110 may include solar panels SP4, brackets SP5, a planar four-bar linkage (e.g., a planar closed connection structure formed by dotted lines and connection points used for connecting the dotted lines in FIG. 11) and a central support column (not illustrated in FIG. 11). In an example of FIG. 11, the planar four-bar linkage may include a first bar linkage PB1, a second bar linkage PB2, a third bar linkage PB3 and a fourth bar linkage PB4, wherein the first bar linkage PB1 may be connected to the second bar linkage PB2, the second bar linkage PB2 may be connected to the third bar linkage PB3, the third bar linkage PB3 may be connected to the fourth bar linkage PB4 and the fourth bar linkage PB4 may be connected to the first bar linkage PB1, to form the planar closed connection structure, which may be used for unfolding the solar panels SP4 and the brackets SP5. The brackets SP5 may or may not be a part of the planar four-bar linkage. In other examples, the solar power generation device 110 may include a planar multi-bar linkage for unfolding or folding the solar panels SP4 and the brackets SP5, which may include a plurality of bar linkages. The plurality of bar linkages may be connected to form a planar closed connection structure.

FIG. 12 is a schematic diagram of a wind power generation device 120 according to an example of the present invention, and may be used for realizing the wind power generation device 80 in FIG. 8. In FIG. 12, a side-top view 1200 of a folded mode, a side-top view 1202 of an unfolded mode, a side view 1210 of a folded mode and a side view 1212 of an unfolded mode of a wind power generation device 120 are illustrated. Similar to the wind power generation device 80, the wind power generation device 120 may include fan blades WF5, brackets WF6, a rotor WF7, a planar slide six-bar linkage (e.g., a planar closed connection structure formed by dotted lines and connection points used for connecting the dotted lines in FIG. 12), a central support column WF8 and a connecting column WF9. In an example of FIG. 12, the planar slide six-bar linkage may include a first bar linkage PSB1, a second bar linkage PSB2, a third bar linkage PSB3, a fourth bar linkage PSB4, a fifth bar linkage PSB5 and a sixth bar linkage PSB6, wherein the first bar linkage PB1 may be included in the rotor WF7 and may be connected to the fourth bar linkage PSB4. The fourth bar linkage PSB4 may be connected to the third bar linkage PSB3, and the third bar linkage PSB3 may be connected to the second bar linkage PSB2. The fourth bar linkage PSB4 may be further connected to the fifth bar linkage PSB5, and the fifth bar linkage PSB5 may be connected to the sixth bar linkage PSB6, wherein the sixth bar linkage PSB6 may be included in the fan blades WF5. The second bar linkage PSB2 and the fifth bar linkage PSB5 may each include a slide rail structure for sliding up and down. The connecting column WF9 may be connected to the second bar linkage PSB2 and a ring structure in the central support column WF8. The brackets WF6 may or may not be a part of the planar slide six-bar linkage. It should be noted that, in order to show positions of the first bar linkage PSB1-the sixth bar linkage PSB6, the structure of the fan blade WF5 and the rotor WF7 are partially simplified.

In one example, the lifting platform (e.g., the ring structure in the central support column WF8) may slide from the top to the bottom via a driver for the wind power generation device 120, when the lifting platform drives the wind power generation device 120 to be unfolded (e.g., switching from the folded mode to the unfolded mode). In the situation that the connecting column WF9 is connected to the ring structure in the central support column WF8 and the second bar linkage PSB2, the connecting column WF9 may drive the second bar linkage PSB2 and the fifth bar linkage PSB5 slide from the top to the bottom, to unfold the fan blades WF5 and the brackets WF6 and to automatically rotate the rotor WF7. In one example, the lifting platform (e.g., the ring structure in the central support column WF8) may slide from the bottom to the top via a driver for the wind power generation device 120, when the lifting platform drives the wind power generation device 120 to be folded (e.g., switching from the unfolded mode to the folded mode). In the situation that the connecting column WF9 is connected to the ring structure in the central support column WF8 and the second bar linkage PSB2, the connecting column WF9 may drive the second bar linkage PSB2 and the fifth bar linkage PSB5 slide from the bottom to the top, to stop rotating the rotor WF7 and to fold the fan blades WF5 and the brackets WF6 on sides of the rotor WF7. In other examples, the wind power generation device 120 may include a planar slide multi-bar linkage for unfolding or folding the fan blades WF5 and the brackets WF6 and for rotating (or stopping rotating) the rotor WF7, which may include a plurality of bar linkages. The plurality of bar linkages may be connected to form a slidable planar closed connection structure.

Those skilled in the art should readily make combinations, modifications and/or alterations on the abovementioned description and examples.

It should be noted that, realizations of the control device 20 (and the reception module 200, the environment generation module 210, the strategy generation module 220 and the transmission module 230 thereof) are various. For example, the modules mentioned above may be integrated into one or more modules, but is not limited thereto. In addition, the control device 20 (and the reception module 200, the environment generation module 210, the strategy generation module 220 and the transmission module 230 thereof) may be realized by means that could be hardware (e.g., circuit), software, firmware (known as a combination of a hardware device and computer instructions and data that reside as read-only software on the hardware device), an electronic system, or combination thereof, but is not limited thereto.

In addition, realizations of the power generation system 30 (and the sensing module 300, the transmission module 310, the receiving module 320 and the at least one power generation module 330 thereof) are various. For example, the modules mentioned above may be integrated into one or more modules, but is not limited thereto. In addition, the power generation system 30 (and the sensing module 300, the transmission module 310, the receiving module 320 and the at least one power generation module 330 thereof) may be realized by means that could be hardware (e.g., circuit), software, firmware (known as a combination of a hardware device and computer instructions and data that reside as read-only software on the hardware device), an electronic system, or combination thereof, but is not limited thereto.

To sum up, the present invention provides a control device and a method of controlling a power generation system. The control device may generate a control strategy to control at least one power generation module of the power generation system according to environmental data, an environmental model and an environmental state. The at least one power generation module may be dynamically (e.g., alternately) risen above a ground level or lower below the ground level to generate a power corresponding to the control strategy according to the control strategy. Thus, the problem of unstable power generation in the prior art is improved. In addition, in the situation that the at least one power generation module may be lowered to the ground level, damage to the power generation system caused by severe climate may be avoided, land resources occupied by the power generation system may be reused, and the power generation system does not need to be placed in a remote area. Thus, the problem in the prior art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control device for controlling a power generation system, comprising:
    a reception module, for receiving environmental data from the power generation system;
    an environment generation module, coupled to the reception module, for generating an environmental state of the power generation system according to the environmental data and an environmental model;
    a strategy generation module, coupled to the environment generation module, for generating a power of the power generation system according to the environmental state, and for generating a control strategy of the power generation system according to the power; and
    a transmission module, coupled to the strategy generation module, for transmitting the control strategy to the power generation system;
    wherein the power generation system comprises a plurality of power generation modules, the control strategy indicates the power generation system to activate and deactivate the plurality of power generation modules separately, each of the plurality of power generation modules comprises a lifting platform, the activated power generation modules are raised above a ground by corresponding lifting platforms, and the deactivated power generation modules are lowered below the ground by corresponding lifting platforms.

2. The control device of claim 1, wherein the environmental data comprises at least one information of the following information: an environmental temperature of the power generation system, an environmental humidity of the power generation system, an environmental air pressure of the power generation system, an environmental topography of the power generation system, or an environmental shelter information of the power generation system.

3. The control device of claim 1, wherein the environmental model comprises at least one algorithm of a climate prediction algorithm or a light source efficiency algorithm.

4. The control device of claim 1, wherein the environmental state comprises at least one information of the following information: an environmental wind speed, an environmental sunlight intensity, an environmental light source incident angle or an environmental rainfall.

5. The control device of claim 1, wherein each of the plurality of power generation modules further comprises at least one power generation device, wherein the at least one power generation device comprises at least one of a solar power generation device, a wind power generation device and a hydropower generation device.

\* \* \* \* \*